(12) United States Patent
Guajardo

(10) Patent No.: US 12,317,344 B2
(45) Date of Patent: May 27, 2025

(54) RIGHTSIZING SOFTWARE STACKS

(71) Applicant: DISH Wireless L.L.C., Englewood, CO (US)

(72) Inventor: Marcel Antonio Guajardo, Lakewood, CO (US)

(73) Assignee: DISH Wireless L.L.C., Englewood, CO (US)

(*) Notice: Subject to any disclaimer, the term of this patent is extended or adjusted under 35 U.S.C. 154(b) by 277 days.

(21) Appl. No.: 17/875,726

(22) Filed: Jul. 28, 2022

(65) Prior Publication Data

US 2024/0040641 A1  Feb. 1, 2024

(51) Int. Cl.
*H04W 76/00* (2018.01)
*H04W 76/14* (2018.01)

(52) U.S. Cl.
CPC .................. *H04W 76/14* (2018.02)

(58) Field of Classification Search
CPC ..... H04W 76/14; H04W 76/15; H04W 76/18; H04W 76/27; H04W 76/34
See application file for complete search history.

(56) References Cited

U.S. PATENT DOCUMENTS

| 2024/0276365 A1* | 8/2024 | Abotabl | H04W 52/0206 |
| 2024/0284325 A1* | 8/2024 | Abotabl | H04L 5/001 |
| 2024/0314646 A1* | 9/2024 | Orsino | H04W 76/27 |

* cited by examiner

*Primary Examiner* — Ping Y Hsieh
(74) *Attorney, Agent, or Firm* — Wash Park IP Ltd.; John T Kennedy

(57) ABSTRACT

A process for right-sizing a software stack includes: identifying a first wireless communications node (1WCN) for a wireless communications system (WCS) that includes a second wireless communications node (2WCN), obtaining a first adaptive software stack (1ASS) which configures the Device to communicate data to a Destination using the 1WCN, and determining if the 1ASS optimizes the Device for the communicating of the data with the Destination via the 1WCN. If not optimized, a second adaptive software stack (2ASS) may be obtained and a determination made as to whether the 2ASS second optimizes the Device. At least one of the 1ASS and the 2ASS may be implemented and the Device is coupled with the 1WCN by a communications links. A first application may be selected and executed. During software execution application data may be communicated with the Destination using the 1WCN and the as implemented 1ASS or 2ASS.

20 Claims, 5 Drawing Sheets

RIGHTSIZING SOFTWARE STACKS

TECHNICAL FIELD

The technology described herein generally relates to devices, systems, and processes for rightsizing software stacks on wireless device and facilitating utilization of multiple wireless networking technologies.

BACKGROUND

Wireless devices and sensors (herein, "Devices") are commonly defined by distinct categories according to type, size, networking and communications technologies utilized, priority of communications and otherwise. Devices may include low-power, wide-area Internet-of-Things ("IoT") devices which are commonly designed for long battery life (where electrical power from a battery is available for five (5) or more years), low power consumption, infrequent and small data packet communications, and lower cost. Device may have a small package size (e.g., a package size with dimensions of less than one-half inches (0.5") width, two inches (2") length and two inches (2") depth)

Devices may include cellular devices, such as cell phone, smartphones, and the like are commonly configured to facilitate data communications of multiple Megabits per second (Mbps), and often greater than one hundred Mbps. Cellular devices may be configured to support data intensive applications, such as video streaming, social media, online gaming, and the like.

Recently, the $3^{rd}$ Generation Partnership Program (3GPP) has released, "Release 17" which introduces a new type of IoT device category. Per Release 17, IoT devices may be configured with reduced capabilities ("RedCap"). Redcap devices are a form of a Device that may be configured to send more data packets and with a higher prioritization (as compared to other narrowband IoT devices). Accordingly, Devices may be configured specifically for RedCap capabilities by use of a corresponding subscriber identity module ("SIM"). Further, a given SIM commonly is compatible with a given network configuration (including networking protocols, frequencies utilized, and the like).

Further, a given Device may at varying times have varying wireless communications technology needs, for example, RedCap communications technologies may be needed at a given time, while at other times, utilized narrowband IoT or other communications technologies may be needed (the "need" arising from the communication of one or more data packets pursuant to one or more "communications parameters," with non-limiting examples including latency, bandwidth, throughput, frequency, security, redundance, or the like). That is, the communications needs of a given Device) may vary by use and/or need arising at any given time or period. Today, multiple SIMs are commonly provided in Devices configured with multiple communications capabilities, with a given SIM commonly supporting a given wireless communications technology (wherein a "wireless communications technology" includes device components, wireless signaling properties, protocols, technologies, and the like used to facilitate wireless communications within one or more predetermined communications parameters.

The need for multiple SIM and other wireless communications technologies commonly limits a range of applications and/or uses for a given Device. A given Device, may be present (at a given time) in an actualized and/or virtualized environment that includes multiple different wireless communications technologies, supporting varying wireless communications parameters. In such an environment, a Device is may be configured to utilize one or more of first wireless communications technologies to support a first communications need, while using one or more second wireless communications technologies to support a second communications need. The needs may arise at the same or a different time. For example, a Device may be utilizing an application program which provides telemetry regarding a state of the Device to a monitoring station, while also utilizing a second application program facilitating video streaming. The first application may use a high latency, low bandwidth wireless communications technology while the second application may need (to obtain a given standard of performance, such as providing 4K video) a low latency, high bandwidth wireless communications technology. Commonly today, a Device may use either two SIMs, a first SIM for the first application and a second SIM for the second application, or inefficiently utilize the second wireless communications technology to support the first application and the second application. Given the need for multiple SIMs, Device manufacturers are commonly limited by device size, cost, power, and other considerations in their design flexibility.

Further, with a Device commonly needing a given SIM to support use of a given wireless communications technology, and users often not desiring to purchase Devices having multiple SIMS, or a collection of SIMs (often due to cost and other constraints), manufacturers and system operators commonly face a Device management conundrum, where some Devices subscribing to a given Operator's wireless services are compatible with some wireless communications technologies, while other subscribing Devices are compatible with one or more second (or set thereof) and/or different wireless communications technologies. Accordingly, the type and number of Stock Keeping Units ("SKUs") a wireless services Operator may need to support varying Devices, to serve legacy and new wireless communications technologies, may become unwieldly and delay or otherwise inhibit adoption of new wireless communications technologies, optimization of wireless communications technologies, and the like.

Further, Devices that support utilization of multiple wireless communications technologies commonly involve user intervention to select, configure, and/or otherwise utilize a given wireless communications technology and/or a given wireless communications service. Such user intervention may create inefficiencies in the communication of data between the Device and a given destination, such as a web server, another Device, or the like.

Accordingly, the various implementations and implementations described herein provide devices, systems and processes which address the above and other concerns.

SUMMARY

The various implementations described herein provide devices, systems, and processes for optimizing utilization of wireless networking technologies by use of rightsized software stacks on Devices.

In accordance with at least one implementation, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including computer instructions that, when executed by data processing apparatus, cause the apparatus to perform the actions. One general aspect includes a process for right-sizing a software stack. The process may include first identifying, by a device, a first wireless communications node (1WCN) for a wireless communications system (WCS). The WCS may include the 1WCN and a second wireless communications node (2WCN).

The process may include first obtaining, by the device, a first adaptive software stack (1ASS) which, when executed by a device processor, configures the device to communicate data to a destination using the 1WCN. The process may include first determining if the 1ASS first optimizes the device for the communicating of the data with the destination via the 1WCN. If not first optimized, the process may include second obtaining a second adaptive software stack (2ASS), and second determining if the 2ASS, when executed by the device processor, second optimizes the device for the communicating of the data with the destination via the 2WCN.

The process may include implementing, by the device, at least one of the 1ASS and the 2ASS, coupling the device with the 1WCN using at least one communications links, selecting a first application, and executing the first application by the device and at a first time/The execution of the first application may include communicating application data with the destination using the 1WCN and the as implemented 1ASS or 2ASS. Other embodiments of this aspect include corresponding computer systems, apparatus, and computer programs recorded on one or more computer storage devices, each configured to perform the actions of the methods.

Implementations may include one or more of the following features. The process may include iteratively repeating the second obtaining and second determining operations until another adaptive software stack (AASS) may be obtained. The AASS, when executed by the device processor, may third optimize the devices to communicate the application data with the destination via the 1WCN or the 2WCN. The first optimization, when available, may be utilized before the second optimization and the third optimization. When the first optimization is not available, the second optimization may be utilized before the third optimization. The third optimization may be utilized when the first optimization and the second optimization are not available. The first optimization, second optimization, and third optimization provide, from a greater extent to a lesser extent, utilization efficiencies of WCS resources. The 1WCN may support fifth generation (5G) and fourth generation (4G) wireless communications. The 1ASS may optimize the device for 5G wireless communications and the 2ASS may optimize the device for 4G wireless communications.

The process may include second coupling the device with the 2WCN and third retrieving, by the device, a third adaptive software stack (3ASS) which, when executed by a device processor, configures the device to communicate the application data to the destination using the 2WCN. The process may include fourth determining which of a plurality of permutations of an ASS and a WCN optimizes the device for communicating application data with the destination via the 1WCN or the 2WCN. The plurality of permutations may include a first permutation of the 1ASS with the 1WCN. The plurality of permutations may include a second permutation of the 2ASS with the 1WCN. The plurality of permutations may include a third permutation of the 3ASS with the 2WCN. The plurality of permutations may include a fourth permutation of either the 1ASS or the 2ASS with the 1WCN and the 3ASS with the 2WCN.

The process may include selecting a permutation from at least one of the plurality of permutations which optimizes the device for communicating the application data with the destination. The process may include second executing the application, at a first time, in view of the selected permutation.

For an implementation, the 2ASS may optimize the device for use with 4G wireless communications via the 1WCN.

The WCS may include additional wireless communications nodes (AWCNs) including a third wireless communications node (3WCN) configured to support Advanced Television Standards Committee (ATSC) 3.0 wireless communications. The WCS may include a fourth wireless communications node (4WCN) configured to support citizens band radio services (CBRS) wireless communications. The WCS may include a local wireless communications node (LWCN) configured to support at least one of Wi-Fi and low-rate wireless personal area network (LR-WPAN) wireless communications.

The process may include selecting one of the AWCNs for use by the device while executing the first application. The process may include selecting at least one ASS which optimizes the device for the selected AWCN. The process may include third executing the application, at least in part, in view of the selected AWCN.

For at least one implementation, the first application may be a video streaming application and the 1ASS may support streaming of a 4K or lesser resolution video signal over the WCS. The 2ASS may support streaming of a high definition (HD) or lesser resolution video signal over the WCS.

For an implementation, the 3ASS, when executed by the device processor, may configure the device for use with the first application and the WCS and in view of a constraint change. Execution of the 3ASS, by the device processor, may result in an unoptimized communication of application data with the destination.

For an implementation, the 1ASS may be obtained, by the device, from a device data store.

For an implementation, the device may be coupled, by the WCS, to a server. The 2ASS may be obtained, by the device, from a server data store.

For an implementation, at least one of the 1ASS and the 2ASS may be generated by the server. At least one of the first determining, the second determining, the third determining, and the fourth determining may be executed by the server.

For an implementation, the device may be coupled, by the WCS, to a server and at least one of the 1ASS and the 2ASS may be provided by the server to the device. At least one of the first determining and the second determining may be performed by the server. Implementations of the described techniques may include hardware, a method or process, or computer software on a computer-accessible medium.

For at least one implementation, a wireless communications system may include a first wireless communications node (1WCN), a second wireless communications node (2WCN), a device coupled to the 1WCN, and the 2WCN, and a destination coupled to the device by one or more of the 1WCN and the 2WCN.

The system may include a device that includes at least a device processor, a device communications interface, and a device data store. The device processor, device data store, and device communications interface may be coupled together by a device bus. The device data store may non-transiently store non-transient computer instructions including: first computer instructions instantiating a device stack engine. The device stack engine, when executed, may configure and/or instruct the device to perform one or more stack operations. Non-limiting example instructions may include first obtaining a first adaptive software stack (1ASS) and first determining if the 1ASS first optimizes the device to communicate data with the destination and via the 1WCN or the 2WCN. If not first optimized, the instructions may include second obtaining a second adaptive software stack (2ASS) and second determining if the 2ASS optimizes the device for communicating data with the destination via the 1WCN or the 2WCN. The system may include implementing, by the device, at least one of the 1ASS and the 2ASS.

The system may include second computer instructions instantiating a device connection engine. The device connection engine may configure the device to perform one or more connectivity operations. Non-limiting example of connectivity operations may include configuring the device communications interface in accordance with the, as implemented, 1ASS, 2ASS or 1ASS and 2ASS. The operations may include coupling the device with one or more of the 1WCN or 2WCN based on the as implemented 1ASS, 2ASS, or 1ASS and 2ASS.

The system also may be configured to support the device communicating application data with the destination via the coupling. Other embodiments of this aspect include corresponding computer systems, apparatus, and computer programs recorded on one or more computer storage devices, each configured to perform the actions of the methods.

Implementations may include one or more of the following features. The device may obtain the 1ASS from the device data store or generates the 1ASS based upon at least one constraint of the 1WCN. The device may obtain the 1ASS from the server. The server may generate the 1ASS based upon one or more constraints of the wireless communications system, the device, the 1WCN, the 2WCN, the destination, and/or the network. The server may generate a third adaptive software stack (3ASS) when a change occurs within the wireless communications system. The device communications interface may include: a universal modem, an electronic subscriber identity module (eSIM); a software defined radio; and a software defined antenna.

For an implementation, the device, as per an as implemented 1ASS, 2ASS or 1ASS and 2ASS, may change at least one operating characteristic of an universal modem, an eSIM a software defined radio, and a software defined antenna. Implementations of the described techniques may include hardware, a method or process, or computer software on a computer-accessible medium.

For at least one implementation, a non-transient computer readable medium may include first non-transient computer instructions, which when executed by a hardware processor of a device, configures the device to adaptively utilize of one or more wireless communications nodes (WCNs) in a wireless communications system (WCS). For an implementation, they device may be so configured by performing one or more stack operations which may include first obtaining, by the device, a first adaptive software stack (1ASS) and first determining, by the device, if the 1ASS first optimizes the device to communicate data with a destination coupled to the device via at least one of a first wireless communications node (1WCN) and a second wireless communications node (2WCN) of the WCS. The stack operations may include when and/or if the device is not first optimized, second obtaining a second adaptive software stack (2ASS), and second determining if the 2ASS optimizes the device to communicate data with the destination via the 1WCN or the 2WCN. The stack operations may include implementing, by the device, at least one of the 1ASS and the 2ASS. Other embodiments of this aspect include corresponding computer systems, apparatus, and computer programs recorded on one or more computer storage devices, each configured to perform the actions of the methods.

Implementations may include one or more of the following features. The non-transient computer readable medium may include second non-transient computer instructions which, when executed by the hardware processor of the device, configures the device to adaptively utilizes of one or more WCNs. To use one or more WCNs, the device may be configured to perform one or more connectivity operations that may include configuring a device communications interface in accordance with an as implemented, 1ASS, 2ASS, or 1ASS and 2ASS. The connectivity operations may include coupling the device with one or more of the 1WCN or 2WCN based on the as implemented 1ASS, 2ASS, or 1ASS and 2ASS. Implementations of the described techniques may include hardware, a method or process, or computer software on a computer-accessible medium.

BRIEF DESCRIPTION OF THE DRAWINGS

The features, aspects, advantages, functions, modules, and components of the devices, systems and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

DETAILED DESCRIPTION

Figure 1:
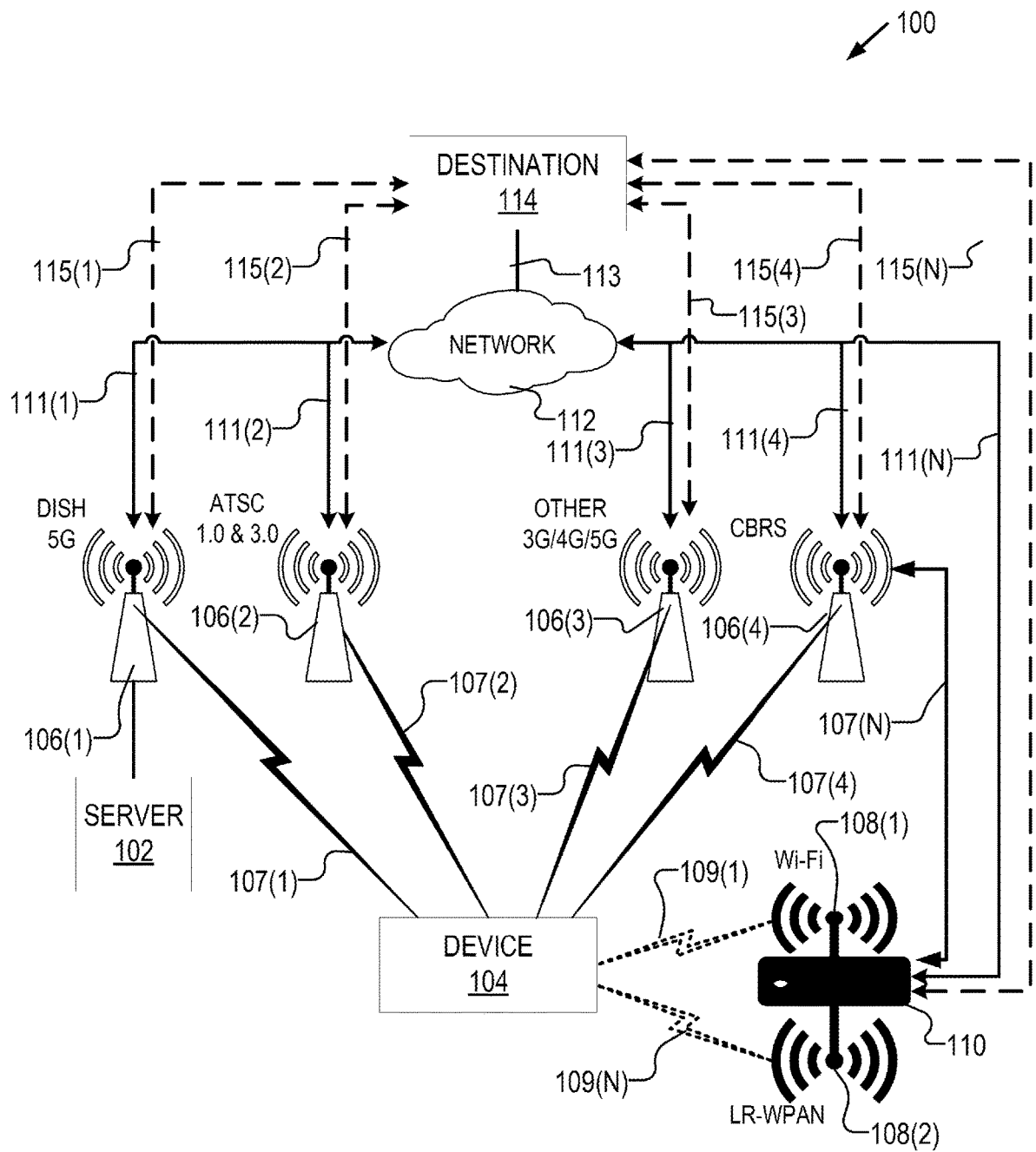
FIG. 1 is a schematic representation of a system which right sizes software stacks on a Device and in accordance with at least one implementation of the present disclosure.

Various implementations of the present disclosure describe devices, systems, and processes for right sizing a software stack on a Device.

"Data" (which is also referred to herein as a "computer data" and "data packet(s)") refers to any representation of facts, information, or concepts in a form suitable for processing by one or more electronic device processors and which, while and/or upon being processed, cause or result in an electronic device or other device to perform at least one function, task, operation, provide a result, or otherwise. Data may exist in a transient and/or non-transient form, as determined by any given use of the data.

An "Instruction" (which is also referred to herein as a "computer instruction") refers to a non-transient processor executable instruction, associated data structure, sequence of operations, program modules, or the like. An instruction is defined by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise.

"Processor" refers to one or more known or later developed hardware processors and/or processor systems configured to execute one or more computer instructions, with respect to one or more instances of data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, and otherwise.

A "computer engine" (or "engine") refers to a combination of a "processor" and "computer instruction(s)." A computer engine executes computer instructions to perform one or more logical operations (herein, a "logic") which facilitate various actual (non-logical) and tangible features and function provided, in whole or in part, by an electronic device.

"Substantially simultaneous(ly)" means without incurring a greater than expected and humanly perceptible delay between a first event or condition and second event or condition. Substantial simultaneity may vary in a range of quickest to slowest expected delay to a longer delay. It is to be appreciated that the subject and acceptable threshold of "substantial simultaneity" may include considerations of distance, data processing capabilities and/or and data communication capabilities. For example, content provided in data packets over gigabit Ethernet capable local area network (LAN) connections may have a shorter acceptable delay period (and a more stringent substantially simultaneous delay period) than content presented over a 3G network, where data communications are knowingly slower and thus a given (longer) delay period may satisfy a subject substantially simultaneous threshold.

"Cloud" refers to cloud computing, cloud storage, cloud communications, and/or other technology resources which a given user does not actively manage or provide. A usage of a Cloud resource may be private (limited to certain users and/or uses), public (available for users and/or uses), hybrid, dedicated, non-dedicated, or otherwise. It is to be appreciated that implementations of the present disclosure may use Cloud resources to provide for processing, storage and other functions related to facilitating live cell phone watch parties.

"Module" recites definite structure for an electrical/electronic device that is configured to provide at least one feature and/or output signal and/or perform at least one function including the features, output signals and functions described herein. A module may provide the one or more functions using computer engines, processors, computer instructions and the like. When a feature, output signal and/or function is provided, in whole or in part, using a processor, one more software components may be used, and a given module may be include a processor configured to execute computer instructions. A person of ordinary skill in the art (a "POSITA") will appreciate that the specific hardware and/or computer instructions used for a given implementation will depend upon the functions to be accomplished by a given module. Likewise, a POSITA will appreciate that such computer instructions may be provided in firmware, as embedded software, provided in a remote and/or local data store, accessed from other sources on an as needed basis, or otherwise. Any known or later arising technologies may be used to provide a given module and the features and functions supported therein.

"Device" refers to electronic device configured to communicate data to and/or from a destination using a wireless communications technology. A device may include and/or be communicatively coupled to one or presentation devices, such as a display device, audible output device, or otherwise. Non-limiting examples of devices include smart phones, smart televisions, tablet computing devices, lap-top computers, desk-top computers, gaming consoles, cable/satellite set-top-boxes (STB), 10-Foot presentation devices, IoT devices, and the like. For at least one implementation, a Device utilizes a wireless communications technology service provided by a Mobile Network Operator ("MNO"). A non-limiting list of MNOs include DISH Network, A&T, Verizon, T-Mobile in the United States and other MNOs worldwide, such as ORANGE, TELEKOM, O2, VODAFONE, and others.

An "Application" is a set of computer instructions that configure a processor perform one or more tasks that are other than tasks commonly associated with the operation of the processor itself (e.g., a "system software," an example being an operating system software), or the providing one or more utilities provided by a device (e.g., a "utility software," an example being a print utility). An application may be bundled with a given device or published separately. Non-limiting examples of an application include word processing, video streaming, gaming, and the like.

A "Software Stack" is an adaptive collection of data and computer instructions, which facilitate use of one or more wireless communications technologies by one or more Devices. A software stack may use different data and/or computer instructions for different wireless communications technologies and/or for different Devices and/or applications. A software stack may be configured for use with software defined radios and software defined radios. Being adaptive, the software stack may be modified, without requiring modifications to underlying communications components, such as signal processors, processors, transmitters, amplifiers, and the like as advancements occur in software defined radios, software defined radios, and related and other data processing and telecommunications technologies. Known and/or later arising software defined radios, software defined antennas, software stacks, and related technologies may be used in one or more implementations of the present disclosure.

"Coupling" refers to establishment of a communications link between two or more elements of a given system. A coupling may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, IoT networks, Cloud based networks, private networks, public networks, or otherwise. One or more communications and networking standards and/or protocols may be used including, without limitation, the TCP/IP suite of protocols, the Extensible Message and Presence Protocol (XMPP), VOIP, Ethernet, Wi-Fi, CDMA, Z-WAVE, Near Field Communications (NFC), GSM/GRPS, TDMA/EDGE, EV/DO, WiMAX, SDR, LTE, MPEG, and others. A coupling may include use of physical data processing and communication components. A coupling may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized for a given coupling.

"Software Defined Radio" refers to a wireless communications system component wherein functions that may be implemented in hardware are implemented by use of data and computer instructions on a processor or other embedded system. A software defined radio may be configured for use with multiple wireless communications systems protocols, standards, and the like.

"Software Defined Antenna" refers to an antenna that is capable of dynamically, controllably and reversibly modifying one or more wireless signal properties such as frequency, signal strength, direction, polarization, or otherwise.

"eSIM" refers to a programmable form of Subscriber Identity Module ("SIM"). For at least one implementation, an eSIM is embedded into a Device.

"U-Modem" and "Universal Modem" refers a modem (modulator/demodulator) that can be configured for use with two or more modulation formats. The modulation formats may be associated with two or more forms of couplings (as defined above).

"OSI" and "OSI Model" refer to the well-known Open Systems interconnection model.

As shown in FIG. 1, a wireless communications system (WCS) 100 for right sizing a software stock on a Device may include one or more of a server 102, a Device 104, one or more wireless communications nodes ("WCNs"), such as a remote wireless communications node ("RWCN") 106 and a local wireless communications node ("LWCN") 108, a network 112, and a Destination 114.

Server 102

Figure 2:
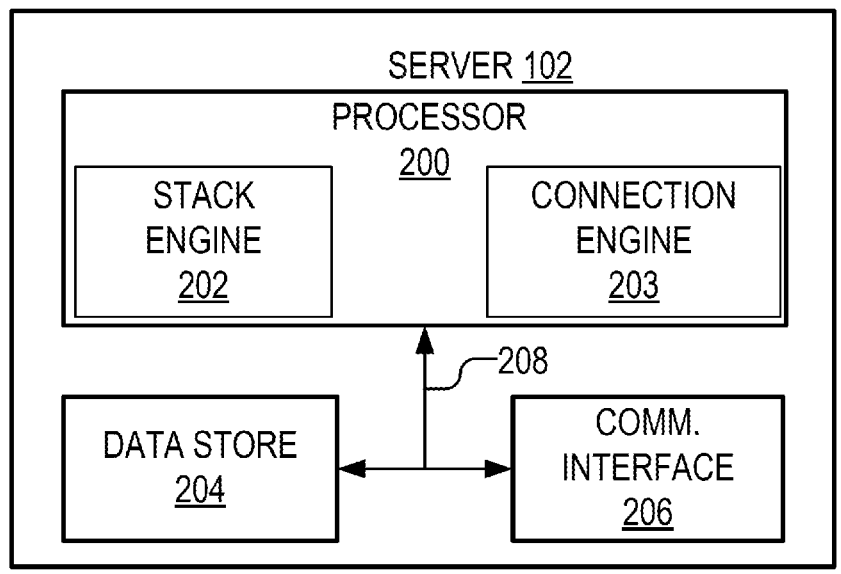
FIG. 2 is a schematic representation of a server configured to right size software stacks on a Device and in accordance with at least one implementation of the present disclosure.

As shown in FIG. 2 and for at least one implementation of the present disclosure, a server 102 may include a server processor 200, a server data store 204, a server communications interface 206, and other commonly well-known components an electronic wireless communications and/or computing device with non-limiting (non-shown) examples including a power supply, a security module (which may be provided physically and/virtually), a user interface, one or more communications components such as antennas, amplifiers, mixers, and the like. A server bus 208 couples the various server 102 components operably together. The server 102 may be communicatively coupled, directly or indirectly, with one or more Devices 104, RWCNs 106, LWCNs 108, networks 112, destinations 114, or otherwise.

The server 102 may be provided in the virtual domain and/or in the physical domain. The server 102 may be associated with a human user, a machine process executing on one or more computing devices, an Application Program Interface (API), a web service, instantiated on the Cloud, distributed across multiple computing devices, or otherwise. The server 102 may be any electronic device configurable to communicate data using a network, directly or indirectly, to another device, to another server, or otherwise.

Server Processor 200

The server processor 200 is herein, also identified as a server central processing unit (CPU) or "server CPU". Any known or later arising processor may be used for the server processor 200. The server processor 200 may be provided by a processing device capable facilitating one or more logics by executing one more computer instructions with respect to data. The server processor 200 may include one or more physical components configured for data processing operations. Any known or later arising technologies may be utilized in conjunction with an implementation of the present disclosure to facilitate the server processor 200.

The server processor 200 may execute computer instructions which instantiate a server stack engine 202 and thereby perform one or more server stack operations which facilitate identifying, configuring, and/or providing an adaptive software stack 303 by a Device 104. For at least one implementation, the server stack engine 202 may perform server stack operations which right-size an adaptive software stack 303 by a Device 104.

The server processor 200 may execute computer instructions which instantiate a server connection engine 203 and thereby perform one or more server connection operations which facilitate identifying, configuring, coupling, and otherwise using a Device 104 with one or more other WCS 100 components and in view of an adaptive software stack 303 provided to at least the Device 104.

For at least one implementation, the server stack engine 202 may be configured to optimize use, by a given Device 104, of two or more RWCNs 106 and/or LWCNs 108 with respect to one or more applications being executed by the Device 104 at a given time, at a given location, in view of other applications being executed by the Device 104, in view of RWCN and/or LWCN needs for other Devices, in view of combinations and/or permutations of the foregoing, and otherwise.

The server processor 200 may instantiate computer engines, including the server stack engine 202 and the server connection engine 203, as one or more threads operating on a computing system having a multiple threaded operating system, such as the WINDOWS 10 operating system, LINUX, APPLE OS, ANDROID, and others, as an application program on a given device, as a web service, or otherwise. An Application Program Interface (API) may be used to support an implementation of the present disclosure. A computer engine may be executed by one or more threads on the server processor 200, on the Cloud, or otherwise.

The server processor 200 may be communicatively coupled, by the server bus or similar structure, to other components of the server 102 including, but not limited to, the server data store 204, which may also be referred to as a "server computer readable storage medium." The server data store 204 may be configured to store data and/or computer instructions for providing an adaptive software stack 303 to at least one Device 104.

Server Stack Engine 202

With reference to the operations depicted in FIGS. 4, 5 and 6 (as further described below), the server stack engine 202, in conjunction with a Device stack engine 302 (as further described below) configures a Device 104 with a "right sized software stack." As used herein, a "right sized software stack" is a collection of one or more data and computer instructions which configure a given Device 104 to use one or more WCNs (and related links), at a given time, for one or more given applications, and in view of one or more (if any) other uses of the given one or more RWCNs and/or LWCNs available to the given Device 104, at the given time. The given time may be a current time, a period, a future time, or otherwise. The WCNs available for use for a given Device 104 and/or a given application may vary be Device location, time of day, day of week, month, year, environmental conditions, Device characteristics (e.g., stationary or mobile, high-power or low-power), or otherwise. For example, a stationary Device 104 may be configured to utilize a given WCN for any use of a given application, whereas a mobile Device 104 may be configured to adaptively use a first WCN while at a first location, a second WCN while at a second location, and the like.

The server stack engine 202 may be configured to adaptively provide data and computer instructions to a Device stack engine 302 to populate an adaptive software stack 303 in the Device 104. The adaptive software stack 303 facilitates adaptive use of one or more WCN, in view of time, application, Device and/or any other condition or constraint then arising, scheduled to arise, or otherwise arising. The adaptive software stack 303 may be pre-loaded into a Device 104, provided by the server stack engine 202 to a Device stack engine 302, updated from time to time, including for at least one implementation on a real-time basis, may be configured to optimize use of one or more, including multiple, WCNs, and otherwise. Adaptive software stack optimization may occur in view of characteristics and properties for a given Device, for multiple Devices 104, for a given application, for multiple applications, for multiple instances of one or more application by one or more Devices 104 coupled to a WCN, a network 112, or otherwise. For at least one implementation, an adaptive software stack may be provided to one or more, including multiple, Devices 104 at any time, such as during a software update.

The server stack engine 202 may be configured to optimize use of WCNs by prioritizing use of WCS 100 resources, as specified by an adaptive software stack 303 provided to two or more Devices 104. Prioritization of WCS 100 resources, and the providing of adaptive software stacks corresponding to such prioritization to one or more Devices 104, may occur in view of any prioritization, filtering, or other schema. For an implementation, Device rankings and/or application rankings may be established by the server 102. For example, emergency response applications, e.g., the U.S. 911 system, may be prioritized over streaming video applications. Other prioritization schema may be based on other requirements, capabilities, and limitations (collectively, "constraints") of one or more WCS 100 components, such as WCN constraints, network 112 constraints, regulatory constraints (as may be promulgated from time to time by a governmental, industry, or other body), and the like.

For at least one implementation, Destination 114 constraints and/or linking constraints (e.g., constraints of one or more Links coupling a given Device 104 with a given Destination 114) may influence elements of an adaptive software stack provided to a given Device 104, Destination 114, or other WCS 100 component. For example, if a Destination 114 is unable to process 4K video streaming, while a Device 104 is so capable, an adaptive software stack 303 provided to a Device 104 by the server 102 may be configured such that other WCS 100 components are correspondingly utilized (e.g., by facilitating the transmission of video streams at a lower resolution, such as a High-Definition resolution, while not utilizing WCS 100 components that could support transmission of 4K video streams). In short, the server stack engine 202 may be configured to provide adaptive software stacks 303 to one or more Devices 104 in view of one or more WCS 100 factors, applications, or otherwise.

Figure 4:
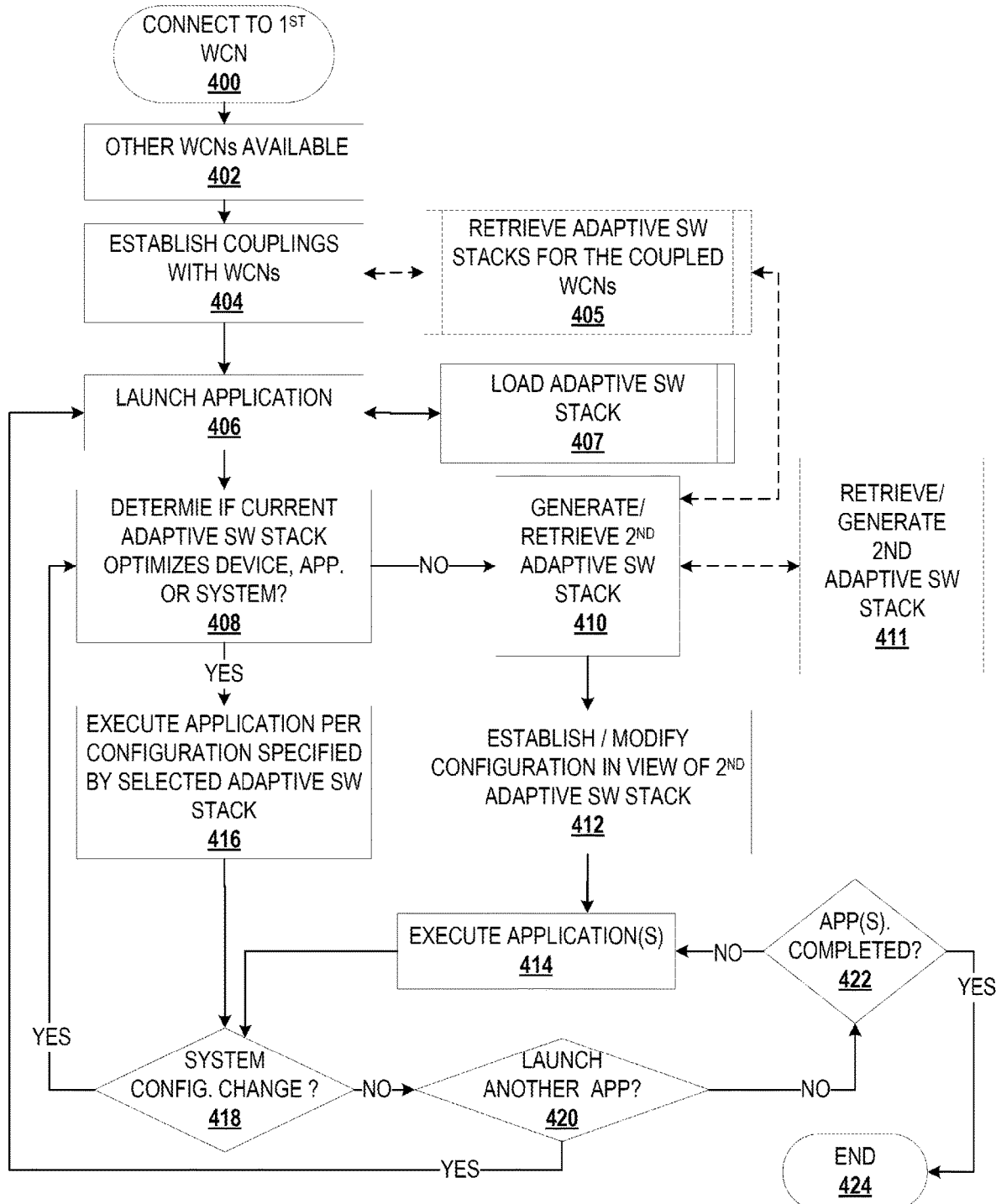
FIG. 4 is a flow chart representing a process for right sizing a software stack on a Device and in accordance with at least one implementation of the present disclosure.

For at least one implementation, one or more operations of the server stack engine 202 and the Device stack engine 302 are illustrated in FIG. 4 (as further described below). Such operations are non-limiting and for at least one implementation of the present disclosure. Other operations, sequences thereof, combinations, and/or permutations thereof may be used in accordance with other implementations of the present disclosure.

Server Connection Engine 203

The server connection engine 203, in conjunction with a Device stack engine 302 (as further described below) may provide data and computer instructions which, when executed by a Device 104, configures the Device 104 for use with at least one WCN and/or other WCS 100 component.

For an implementation, the server connection engine 203 may configure a WCN and/or other WCS 100 component for use with one or more Devices 104, applications, and otherwise.

For an implementation, the server connection engine 203 may be configured to identify, from two or more wireless communications services (e.g., a first RWCN 106(1) and a second RWCN 106(2)) available to a given Device 104, at a given time, and in view of a given application, which of the wireless communications services the Device 104 is to utilize, at that given time, to execute the given application. Based on inputs from the server connection engine 203, the server stack engine 202 may communicate to the Device stack engine 302 data and/or computer instructions needed to populate a given adaptive software stack 303 on the Device 104 so that the Device 104 is configured for use with the given WCNs or other WCS 100 components. Such use may be identified to occur with respect to a given time(s), a period, a given application, combinations and/or permutations of the foregoing, and otherwise. The server connection engine 203 may configured to communicate to a Device 104 data and/or computer instructions, for use and/or execution by the Device 104, to facilitate use of one or more of an RWCN 106 and/or an LWCN 108. The RWCN 106 and/or LWCN 108 utilized (and/or to be utilized) may vary by application being executed (and/or to be executed) by the given Device 104.

For at least one implementation, the server connection engine 203 may manage policy and/or authorization policies which enable a given Device 104 to use one or more WCNs. The server connection engine 203, alone and/or in conjunction with the server stack engine 202, may configure Devices 104, WCNs, and/or other WCS 100 components to support Devices 104 of any type. For example, smartphones as well as IoT devices may be supported by one or more WCNs or WCS 100 components. A Device 104 may be configured, via the adaptive software stack 303 provided to it by the server 102, for use with correspondingly configured WCS 100 components.

For an implementation, one or more non-Device and/or other WCS 100 components may not be configurable by the server 102. For such an implementation, a Device 104 may be provided with an adaptive software stack 303 that reflects such constraints.

The server connection engine 203 alone or in conjunction with the server stack engine 202 may configure Devices 104, WCNs and other WCS 100 components to support one or more given applications. For example, a 5G capable WCN, such as the first RWCN 106(1) may be configured to support 5G video streaming to a given Device 104, while an ATSC 3.0 capable WCN, such as the second RWCN 106(2), may be configured to support the providing of other less data intensive applications and/or services, such as interactive shopping applications, gaming applications, or the like. By so configuring a Device 104 and/or two or more WCNs, the server connection engine 203 and server stack engine 202 may optimize use of WCS 100 components so as to support use by multiple applications, multiple Devices 104, and otherwise.

For at least one implementation, the server connection engine 203, alone or in conjunction with the server stack engine 202, may configure a Device 104 to select a WCN to use for a given application in view of any constraint. Non-limiting examples of such a constraint include WCN signal coverage, signal quality, data packet prioritization schema (e.g., packets from certain Devices or for certain applications having priority over packets from other Devices or applications, cybersecurity (e.g., packets being routed over U.S. based WCNs to a given Destination and not using foreign based WCNs for such routing), data transmission costs, and otherwise. Such constraints may vary by WCN. The server connection engine 203 may be configured to detect variations in WCN constraints, and with the server stack engine 202 identify and provide to one or more Devices 104 an updated adaptive software stack 303 responsive to such variations in WCN constraints. For at least one implementation, an updated adaptive software stack 303 to a Device 104 may occur substantially simultaneously with a detected change in a WCN constraint.

Server Data Store 204

The server data store 204 may be a storage, multiple storages, or otherwise. The server data store 204 may be configured to store data, in whole or in part, in any format, including but not limited to, clear-text, encrypted, uncompressed, compressed, signed, unsigned, combinations of the foregoing, packetizations, or otherwise. The server data store 204 may be provided locally with the server 102 and/or remotely, such as by a data storage service provided on the Cloud, and/or otherwise. Storage of data may be managed by a storage controller (not shown) or similar component. It is to be appreciated such storage controller manages the storing of data and may be instantiated in one or more of the server data store 204, the server processor 200, on the Cloud, or otherwise.

Any known or later arising storage technologies may be utilized in conjunction with an implementation of the present disclosure to facilitate the server data store 204. Non-limiting examples of devices that may be configured for use as server data store 204 include electrical storages, such as EEPROMs, random access memory (RAM), Flash drives, and solid-state drives, optical drives such as DVDs and CDs, magnetic storages, such as hard drive discs, magnetic drives, magnetic tapes, memory cards, such as Compact Flash (CF), Secure Digital (SD) cards, Universal Serial Bus (USB) cards, and others.

Available storage provided by the server data store 204 may be partitioned or otherwise designated by the storage controller as providing for permanent storage and temporary storage. Non-transient data, computer instructions, or other the like may be suitably stored in the server data store 204. As used herein, permanent storage is distinguished from temporary storage, with the latter providing a location for temporarily storing data, variables, or other instructions used for a then arising data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient computer instructions, and other data.

Server Communications Interface 206

The server 102 may include a server communications interface 206. The server communications interface 206 may be configured to use any known or later arising communications and/or networking technologies which facilitate coupling of the server 102 to other WCS 100 components, including but not limited to one or more Devices 104, RWCNs 106, LWCNs 108, and/or Destinations 114. One or more data ports (which are also commonly referred to an input/output interfaces, cards, or the like) may be used to facilitate coupling of the server 102 with one or more WCS 100 components. Such communication interfaces are well-known in the art and non-limiting examples include Ethernet cards, USB and storage medium interface cards, radio frequency transceivers, and others. For at least one implementation, the server communications interface 206 may be configured to couple with one or more antennas, such as a DBS antenna, a STARLINK™ ground station, a broadcast signal antenna (which may be colloquially often referred to as "rabbit ears"), and the like.

Device 104

Figure 3:
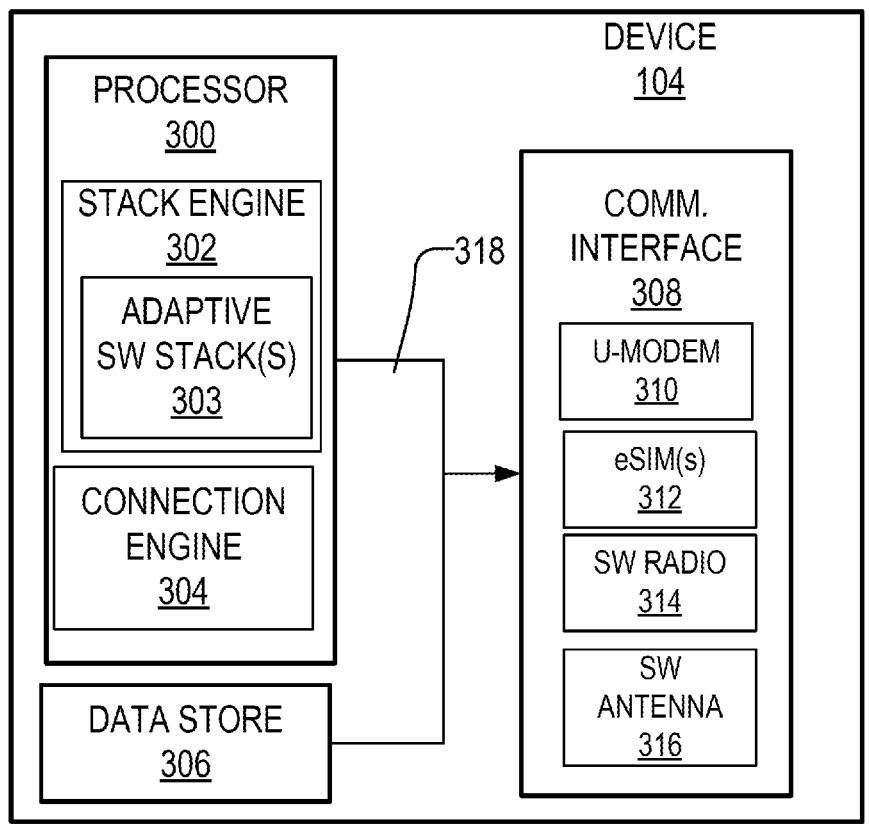
FIG. 3 is a schematic representation of a Device configured for use with a right sized software stack and in accordance with at least one implementation of the present disclosure.

As shown in FIG. 3 and in accordance with at least one implementation of the present disclosure, a Device 104 may include a Device processor 300, a Device data store 306, a Device communications interface 308, which may further include a universal modem ("U-Modem") 310, one or more eSIMs 312, a software defined radio 314, and/or a software defined antenna 316. The Device 104 may also include one or more power, security, user interface and the like (not shown), with such components being well known in the art.

Any currently available and/or future arising implementations of such components may be used in an implementation of the present disclosure.

Device Processor 300

The Device processor 300 is herein, also identified as a Device central processing unit (CPU) or "server CPU". Any known or later arising processor may be used for the Device processor 300. The Device processor 300 may be provided by a processor capable facilitating one or more logics by executing one more computer instructions with respect to data. The Device processor 300 may include one or more physical components configured for data processing operations. Any known or later arising technologies may be utilized in conjunction with an implementation of the present disclosure to facilitate the Device processor 300. The Device processor 300 may execute computer instructions which instantiate one or more computer engine.

For at least one implementation, the Device processor 300 may instantiate a Device stack engine 302 and thereby perform one or more Device stack operations which facilitate the identifying, configuring, and/or use of an adaptive software stack 303 by the Device 104. For at least one implementation, the Device stack engine 302 may perform Device stack operations which right-size an adaptive software stack 303 by the Device 104. For an implementation, Device stack operations may be performed separately by a Device 104, in conjunction with the server stack engine 202, cooperatively with the server stack engine 202, or otherwise.

The Device processor 300 may execute computer instructions which instantiate a Device connection engine 304 and thereby perform one or more Device connection operations which facilitate identifying, configuring, coupling, and otherwise using a Device 104 with one or more other WCS 100 components and in view of an adaptive software stack 303 for the Device 104. For at least one implementation, the Device connection engine 304 may perform Device connection operations separately, in conjunction with the server connection engine 203, cooperatively with the server connection engine 202, or otherwise. For a non-limiting example, a Device 104 may separately perform one or more Device stack operations and/or Device connection operations when the server 102 is not then communicatively coupled to the Device 104 but one or more other WCNs are communicatively coupled to the Device 104.

For at least one implementation, the Device processor 300 may execute computer instructions which instantiate a Device connection engine 304 and thereby perform one or more coupling operations which facilitate identification of one or more WCS 100 component constraints (e.g., which WCNs are within signaling range), selection of a given WCS 100 component in view of such constraint(s) and configuring of one or more Device communications interface 308 components.

The Device stack engine 302 may be configured to optimize use, by a given Device 104, of two or more RWCNs 106 and/or LWCNs 108 with respect to one or more applications being executed by the Device 104 at a given time, at a given location, in view of other applications being executed by the Device 104, in view of RWCN and/or LWCN needs for other Devices, in view of combinations and/or permutations of the foregoing, and otherwise.

The Device processor 300 may instantiate one or more computer engines as one or more threads operating on a computing system having a multiple threaded operating system, such as the WINDOWS 10 operating system, LINUX, APPLE OS, ANDROID, and others, as an application program on a given device, as a web service, or otherwise. An Application Program Interface (API) may be used to support an implementation of the present disclosure. The Device stack engine 302 and/or Device connection engine 304 may be executed by one or more threads on the Device processor 300, on the Cloud, or otherwise.

The Device processor 300 may be communicatively coupled, by a Device bus 318 or similar structure, to other components of the Device 104 such as the Device data store 306, which may also be referred to as a "computer readable storage medium." The Device data store 306 may be configured to store data and/or computer instructions for use by the Device 104 with a non-limiting example include one or more adaptive software stacks 303, data and computer instructions for configuring one or more Device communications interface 308 components, and the like.

Device Stack Engine 302

With reference to FIG. 4, a Device stack engine 302 configures a Device 104 with a right sized adaptive software stack (ASS). For at least one implementation, a Device stack engine 302 may configure the Device 104 independently of, in cooperation with, or in response to data and/or instructions provided by the server stack engine 202. As used herein, configuring a Device includes the selection of an adaptive software stack to utilize by the Device 104. Such selection may occur with respect to one or more Device operations, one or more applications being performed or to be performed by the Device, or otherwise. For a non-limiting example, a Device 104 may independently configure a Device 104 when the Device 104 is not coupled to the server 102.

As discussed above, an adaptive software stack 303 facilitates adaptive use of one or more WCN, in view of time, application, Device and/or any other condition or constraint then arising, scheduled to arise, or otherwise arising. The adaptive software stack 303 may be pre-loaded into a Device 104, provided by the server stack engine 202 to the Device stack engine 302, updated from time to time, including for at least one implementation on a real-time basis, may be configured to optimize use of one or more, including multiple, WCNs, and otherwise. Adaptive software stack optimization may occur in view of characteristics and properties for a given Device 104, for multiple Devices 104, for a given application, for multiple applications, for multiple instances of one or more application by one or more Devices 104 coupled to a WCN, a network 112, or otherwise. For at least one implementation, an adaptive software stack may be provided to one or more, including multiple, Devices 104 at any time, such as during a software update.

For at least one implementation, the Device stack engine 302 may be configured to optimize use of WCNs by prioritizing use of WCS 100 resources, as specified by an adaptive software stack 303. Prioritization of WCS 100 resources, and the generation, receipt, use and otherwise of adaptive software stacks corresponding thereto may occur in view of any prioritization, filtering, or other schema. For an implementation, Device rankings and/or application rankings may be established by a Device 104 and/or a server 102.

For example, emergency response applications, e.g., the U.S. 911 system, may be prioritized by a Device 104, with or without input from the server 102, over streaming video applications. Other prioritization schema may be based on other requirements, capabilities, and limitations (collectively, "constraints") of the given Device 104, one or more WCS 100 components, such as WCN constraints, network 112 constraints, regulatory constraints (as may be promulgated from time to time by a governmental, industry, or other body), and the like.

For at least one implementation, Destination 114 constraints and/or linking constraints (e.g., constraints of one or more Links coupling a given Device 104 with a given Destination 114) may influence elements of an adaptive software stack used by a given Device 104, Destination 114, or other WCS 100 component. Such constraints may be identified in communications between a given Device 104 and a Destination 114. Such communications and constraints provided therein may be known to the Device 104 and not to the server 102. Accordingly, for at least one implementation, a Device 104 may be configured to generate, select and/or use an adaptive software stack that is responsive to one or more WCS 100 component constraints, substantially simultaneously as such constraints occur.

For example, a Destination 114 processing a 4K video stream with a given Device 104 may become unable to continue to process the 4K video stream because of a new Destination 114 constraint (e.g., multiple Devices at the destination seeking to substantially simultaneously receive 4K video—and thereby overloading one or more Destination resource, such as router bandwidth limits). The Device stack engine 302 may be configured to update the adaptive software stack in view of such newly occurring constraint. The change in a WCS 100 component constraint may be provided to the Device stack engine 302 by the Device connection engine 304, by the server stack engine 202, or otherwise. In short, the Device stack engine 302 may be configured to use one or more adaptive software stacks 303 in view of one or more WCS 100 factors, applications, or otherwise. For at least one implementation, a Device 104 may be configured to utilize multiple adaptive software stacks substantially simultaneously.

Device Connection Engine 304

The device connection engine 304 may perform Device connection operations which identify Device communications interface 308 components to use with one or more WCS 100 components. Such identification(s) may occur in view of a given adaptive software stack 303 designated by the Device stack engine 302.

For at least one implementation, the Device connection engine 304 may perform Device connection operations which configure one or more Device communications interface 308 components. For a non-limiting example, the Device connection engine 304 may configure a universal modem ("U-Modem") for use with an ATSC 3.0 RWCN site (such as the $2^{nd}$ RWCN 106(2)) for a first application and for use with an 5G RWCN site (such as the $3^{rd}$ RWCN 106(3)) for another application.

For at least one implementation, the Device connection engine 304 may perform Device connection operations with configure an eSIM 312 for use with a given WCN. For example, to couple with a given WCN, such as the $1^{st}$ RWCN 106(1), a first eSIM may be utilized, while coupling with another WCN, such as the $2^{nd}$ RWCN 106(2), may use a second eSIM. The eSIMs used may be pre-populated on the Device 104, provided in an adaptive software stack 303, or otherwise.

For at least one implementation, the Device connection engine 304 may perform Device connection operations with configure a software defined radio 314 for use with one or more signal processing computer instructions and data to utilize for communication of a given one or more data packets for a given application. For example, for a 4K video streaming application, the Device connection engine 304 may configure the software defined radio 314 to encode/decode data packets in accordance with the IEEE H.265 standard. Similarly, for an HD video streaming application, the Device connection engine 304 may configure the software defined radio 314 to encode/decode data packets in accordance with the IEEE H.24 standard.

For at least one implementation, the Device connection engine 304 may perform Device connection operations with configure a software defined antenna 316 for use with o a given application. For example, a physical antenna (not shown) may be configured to maintain connection with a WCN by use of motors and/or gimbals (which physically reposition an antenna), beam forming (which enables/disables various portions of an antenna array, or the like. It is to be appreciated that wireless signals from a given WCN may have an omni-directional pattern, an area directional pattern, a spot beam pattern, or otherwise. The Device connection engine 304 may configure the software defined antenna 316 in accordance with one or more constraints of one or more WCNs used by the Device 104 and/or in view of one or more applications being executed by the Device 104.

Device Data Store 306

The Device data store 306 may be a storage, multiple storages, or otherwise. The Device data store 306 may be configured to store data, in whole or in part, in any format, including but not limited to, clear-text, encrypted, uncompressed, compressed, signed, unsigned, combinations of the foregoing, packetizations, or otherwise. The Device data store 306 may be provided locally with the Device 104 and/or remotely, such as by a data storage service provided on the Cloud, and/or otherwise. Storage of data may be managed by a storage controller (not shown) or similar component. It is to be appreciated such storage controller manages the storing of data and may be instantiated in one or more of the Device data store 306, the Device processor 300, on the Cloud, or otherwise.

Any known or later arising storage technologies may be utilized in conjunction with an implementation of the present disclosure to facilitate the Device data store 306. Non-limiting examples of devices that may be configured for use as Device data store 306 include electrical storages, such as EEPROMs, random access memory (RAM), Flash drives, and solid-state drives, optical drives such as DVDs and CDs, magnetic storages, such as hard drive discs, magnetic drives, magnetic tapes, memory cards, such as Compact Flash (CF), Secure Digital (SD) cards, Universal Serial Bus (USB) cards, and others.

Available storage provided by the Device data store 306 may be partitioned or otherwise designated by the storage controller as providing for permanent storage and temporary storage. Non-transient data, computer instructions, or other the like may be suitably stored in the Device data store 306. As used herein, permanent storage is distinguished from temporary storage, with the latter providing a location for temporarily storing data, variables, or other instructions used for a then arising data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient computer instructions, and other data.

Device Communications Interface 308

The Device 104 may include a Device communications interface 308. The Device communications interface 308 may be configured to use any known or later arising communications and/or networking technologies which facilitate coupling of the Device 104 to other WCS 100 components, including but not limited to the server 102, one or more WCNs, networks 112, and/or Destinations 114.

The Device communications interface 308 may one or more data ports (which are also commonly referred to an input/output interfaces, cards, or the like), antenna, transceivers, amplifiers and other known and/or later arising physical device layer components (e.g., on the OSI model) which facilitate coupling of the Device 104 with one or more WCS 100 components. Such communication interfaces and components are well-known in the art and non-limiting examples include Ethernet cards, USB and storage medium interface cards, radio frequency transceivers, and others.

For at least one implementation, the Device communications interface 308 may include one or more of a U-Modem 310, an eSIM 312, a software defined radio 314, and a software defined antenna 316. Such components are well-known in the art to a POSIT and any currently available and/or later arising versions of such components may be used in an implementation of the present disclosure.

User Interfaces

The server 102 and/or the Device 104 may include respective user interfaces (not shown). A user interface may include any known or later arising human to device interface user interface device(s). Non-limiting examples of user interface device(s) include audible input/output ("I/O") interfaces for use with audio I/O devices, visual I/O interfaces for use with visual I/O devices, and the like.

For at least one implementation, an audio I/O interface may support a receiving and/or presenting of audible content. Such audible content (which is also referred to herein as being "audible signals") may include spoken text, sounds, or any other audible information. Such audible signals may include one or more of humanly perceptible audio signals, where humanly perceptible audio signals typically arise between 20 Hz and 20 KHz. The range of humanly perceptible audio signals may be configurable to support an audible range of a given individual user. An audio I/O interface includes hardware and computer instructions (herein, "audio technologies") which supports the input and output of audible signals between a user and an electronic device, such as a server 102 or a Device 104. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. An audio I/O interface may use one or more microphones and speakers to capture and present audible signals respectively from and to a user.

A visual I/O interface includes hardware and computer instructions (herein, "visible technologies") which supports the input by and output of visible signals to a user using a server 102 or a Device 104. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O interface may be configured to use one or more visual I/O devices, such as the internal display (not shown) and/or external display (not shown), that are configured to present visible signals to a user. A visual I/O interface may be configured to use one or more image capture devices. Non-limiting examples include lenses, digital image capture and processing software and the like. Accordingly, it is to be appreciated that any existing or future arising visual I/O interfaces, devices, systems and/or components may be utilized.

RWCNs 106

An RWCN is a wireless communications system provided by a network operator ("MNO"). For at least one implementation, a first RWCN 106(1) may utilize DISH WIRELESS™ fifth generation ("5G") wireless communications technologies. A second RWCN 106(2) may utilize Advance Television Systems Committee ("ATSC") promulgated wireless communications technologies, with non-limiting examples including technologies promulgated pursuant to the ATSC 1.0 and/or 3.0 standards (the ATCS 3.0 standard also commonly referred to as the NEXTGEN TV™ standard). A third RWCN 106(3) may utilize other MNOs wireless communications technologies, including 3G/4G/5G and other later arising wireless communications technologies. A fourth RWCN 106(4) may utilize Citizen Band Radio Services ("CBRS") wireless communications technologies, such as those provided by DISH Wireless and others. A first LWCN 108(1) may utilize Wi-Fi™ wireless communications technologies. A POSITA will appreciate that Wi-Fi™ refers to a family of wireless network protocols based on the Institute of Electrical and Electronics Engineers ("IEEE") 802.11 family of standards. Any known or later arising version of the 802.11 standard may be utilized with an implementation of the present disclosure with non-limiting examples including 802.11a/b/n/g/ac/ax/be. A second LWCN 108(2) may be configured to utilize a wireless personal area network communications technology, such as BLUETOOTH™, a low-rate wireless personal area network (LR-WPAN) communications technology, such as one defined by IEEE 802.15.4 standard with one well-known, and non-limiting example, being the ZIGBEE™ specification, or the like.

The Device 104 may be coupled to an RWCN 106 by a first communications link ("1st Link") 107. The Device 104 may be coupled to an LWCN 108 by a second communications link ("$2^{nd}$ Link"). The RWCNs 106 and LWCNs 108 may be coupled to the network 112 using a third communications link ("$3^{rd}$ Link") 111. The network 112 may be coupled to the Destination(s) 114 using a fourth communications link ("$4^{th}$ Link") 113. For at least one implementation, an RWCN 106 and/or an LWCN may be coupled directly to a Destination 114 using a fifth communications link ("$5^{th}$ Link") 115. It is to be appreciated that the designations $1^{st}$ Link to $5^{th}$ Link are provided herein for purposes of description and element identification and not by limitation. Any given $1^{st}$-$5^{th}$ Link may have more, less, or substantially similar communications capabilities another $1^{st}$-$5^{th}$ Link.

RWCN 106 are well-known in the art and any currently available and/or later arising RWCN (and technologies related thereto) may be used in accordance with an implementation of the present disclosure.

LWCNs 108

An LWCN is a wireless communications system intended for use on a local area network (LAN) or the like. For at least one implementation, an LWCN 108 may be a closed system wherein use of the LWCN is restricted by password to a select group of users, such as those associated with a household, a business, or the like. In contrast, an RWCN may be open to any person or entity, provided subscription requirements are satisfied, such as the payment of a membership or subscription fee, a use fee, or the like.

For at least one implementation, an LWCN may include a modem 110, router, or other communications and/or network device which couples the LWCN 108 with one or more RWCNs 106 (by one or more $1^{st}$ Links 107), the network 112 (by one or more $3^{rd}$ Links 111), and/or one or more Destinations 114 (by one or more $5^{th}$ Links 115). A $1^{st}$ Link 107, $2^{nd}$ Link 109, $3^{rd}$ Link 111, $4^{th}$ Link 113, and/or $5^{th}$ Link 115 may use the same, similar, and/or different wireless communications technologies as another Link at any given time, period, location, or otherwise.

LWCN 108 are well-known in the art and any currently available and/or later arising RWCN (and technologies related thereto) may be used in accordance with an implementation of the present disclosure.

Network 112

As used herein, network 112 refers, for any given implementation, to any interconnection of networks. A network 112 may couple multiple Local Area Networks ("LAN"), or the like. A POSITA will appreciate that a LAN commonly operates at the Ethernet or transport layer of the OSI model. A network commonly operates at the network layer of the OSI model. Non-limiting examples of the network 112 include a Home Area Network ("HAN"), a building network, a Campus Area Network ("CAN"), a Backbone, a Metropolitan Area Network ("MAN"), a Wide Area Network ("WAN"), the Cloud, the Internet, an Interplanetary Internet, and the like.

Destination 114

A Destination may be any other Device 104, server, WCN, network 112 component, or otherwise with respect to which a given Device 104 communicates data. A non-limiting example of a Destination is a mobile phone that communicates data (voice, text, video, etc.) with a Device 104. Another non-limiting example of a Destination 114 is web server, an application server, or the like. The Destination 114 facilitate use of the WCS 100 for any lawful purpose.

In FIG. 4 and in accordance with one implementation of the present disclosure, a process is shown for right-sizing software stacks in a Device 104. As shown, the process involves cooperation between the server 102 and the Device 104. For at least one implementation, such respective cooperation may not be utilized and a Device 104 may be configured to separately perform one or more of the stack and/or connection operations depicted in FIG. 4 and/or described herein. By performing one or more of the operations, the WCS 100 may provide various service level assurances, provide cost savings, optimize WCS 100 component utilizations and otherwise provide benefits to WCS 100 level components that are not currently possible using traditional approaches.

As per Operation 400, the process begins when a Device 104 connects to a $1^{st}$ WCN, such as the first RWCN 106(1) or, when the first RWCN 106(1) is not within range with the Device another RWCN 106 or LWCN 108. For at least one implementation, Operation 400 may be performed by the Device connection engine 304.

As per Operation 402, the process may include the Device connection engine 304 and/or the server connection engine 203 determining if one or more additional WCNs are available for use by the Device 104.

As per Operation 404, the process may include establishing couplings, by the Device connection engine 304 solely and/or in conjunction with the server connection engine 203 with one, if any, of the one or more additional WCNs determined per Operation 402. The couplings may include identifying one or more constraints of a WCN, couplings therewith (e.g., wireless signal properties occurring for the coupling) and the like.

As per Operation 405, the process may include retrieving one or more adaptive software stacks for the WCNs coupled with the Device 104. The adaptive software stacks may be retrieved by the Device stack engine 302 from the Device data store 306 (when available thereon) and/or from the server 102. The adaptive software stacks, as needed, may be retrieved from the server data store 204 and/or generated by the server stack engine 202 and provided to the Device 104. The retrieval and/or generation of an adaptive software stack may occur in view of one more WCN constraints, WCS 100 constraints, Device 104 constraints, or other constraints.

As per Operation 406, the process may include the Device 104 launching an application. As used herein, an application is "launched" when first requested for execution by an operating system software, when resumed (for a previously launched application), or otherwise configured to perform one or more tasks by the Device 104, a Destination 114 (as may occur based upon directions provided by a Device 104 to a Destination 114), another WCS 100 component (e.g., a Device 104 configuring a modem 110), or otherwise.

As per Operation 407, the process may include loading (or otherwise bringing into a state of operative use) an adaptive software stack.

As per Operation 408, the process may include determining if a current adaptive software stack optimizes one or more of the Device 104, the application, or other WCS 100 components (such components including, e.g., properties of one or more couplings with one or more WCNs). If a result of the determination is "yes," the process may proceed to Operation 416. If a result of the determination is "no," the process may proceed to Operation 410.

As per Operation 410, the process may include generating and/or retrieving another (identified in FIG. 4 for purposes of clarity as a "$2^{nd}$") adaptive software stack. The retrieving and/or generating of the second adaptive software stack may occur at the server 102, at the Device, or otherwise. One or more of Operations 405 and 411 may be implemented to retrieve and/or generate the $2^{nd}$ adaptive software stack.

As per Operation 411, the process may include generating the $2^{nd}$ adaptive software stack. For at least one implementation, the $2^{nd}$ adaptive software stack may be generated by the server stack engine 202, the Device stack engine 302 and/or a combination thereof. Inputs from one or more of the server connection engine 203 and/or the Device connection engine 304 may be used in the retrieving and/or generating of the $2^{nd}$ adaptive software stack. Non-limiting examples of such inputs may include, Device 104 constraints, application constraints, link constraints, WCN constraints, Destination 114 constraints and/or other WCS 100 constraints.

As per Operation 412, the process may include modifying configurations of the Device, couplings, applications, one or more system components, and/or combinations thereof based on the $2^{nd}$ adaptive software stack. Such modifications may include providing, as applicable, the $2^{nd}$ adaptive software stack by the server 102 to the Device 104. The server stack engine 202 and server connection engine 203 may determine one or more parameters for the $2^{nd}$ adaptive software stacks in view of one or more WCS 100 constraints, generate, modify and/or retrieve (when available) the $2^{nd}$ adaptive software stack and communicate the same to the Device 104. The Device stack engine 302 and Device connection engine 304 may implement the configuration settings specified by the adaptive software stack, such as by configuring one or more Device communications interface components 308. Couplings of the Device 104 with the one or more WCNs and other system components may also occur. As used herein, establishment of one or more such couplings may be commonly referred to as connectivity operation that may be performed pursuant to computer instructions directed by the server connection engine 203 and/or the Device connection engine 304.

As per Operation 414, the process may include executing the application in accordance with the configuration specified by the $2^{nd}$ adaptive software stack.

Referring to Operation 416, when the current adaptive software stack is determined to be optimized (as per Operation 408), the process may include executing the application in accordance with the configuration specified by the current adaptive software stack. As discussed above, a current adaptive software stack may be generic to two or more applications, specification to a set of application, limited to a given application, or otherwise specified. Accordingly, Operations 410-416 may occur with respect to a first application, a second application, multiple applications, or otherwise.

For at least one implementation, Device 104 activates an application by use of known operating system and the like computer instructions with one or more Device configurations being specified in whole or in part by the selected adaptive software engine. The selected adaptive software stack may specify link settings, application settings, and other Device 104 settings. Accordingly, it is to be appreciated that the Device stack engine 302 may be configured to operate in conjunction with other computer instructions being executed, at any given time, by a Device and at various layers of operation for the Device, such as at a communications layer, application layer, operating system layer, programming layer, hardware layer, and data/information layer.

As per Operation 418, the process may include determining, on an interrupt, periodic, scheduled, random, or another basis, whether a change in WCS 100 configuration has occurred. The constraint change, if present, may occur in a link constraint, Device constraint, WCN constraint, server constraint, network constraint, Destination constraint, or otherwise. The change, when present, may positively or negatively impact use of the application by the Device based upon the current adaptive software stack. When a change is detected, the process may proceed to Operation 408 and another determination may be made as to whether, in view of the change, the current adaptive software stacks optimizes one or more of the Device, application, or other WCS 100 components. If a change is not detected the process may proceed to Operation 420.

As per Operation 420, the process may include determining, on an interrupt, periodic, scheduled, random, or another basis, whether another ("$2^{nd}$") application is requested to be launched by the Device 104. If "yes," the process may return, with respect to at least the $2^{nd}$ application, to Operation 406. The operations occurring with respect to the current application may resume in Devices 104 capable of multi-tasking. For Devices not capable of multi-tasking, a launching of the $2^{nd}$ application may result in a suspension, interruption, and/or termination of operations for the current/$1^{st}$ application. If "no," the process may proceed to Operation 422.

As per Operation 422, the process may include determining, on an interrupt, periodic, scheduled, random, or another basis, whether any applications (requiring use of WCS 100 resources beyond those provided by a Device 104 itself) are completed. If "no," the process may resume at Operation 414. If "yes," process may end, as per Operation 424.

It is to be appreciated that any number of adaptive software stacks (ASS) may be used in an implementation of the present disclosure including a first ASS (1ASS), second ASS (2ASS), or another ASS (AASS). Uses of ASSs may occur in various permutations, combinations, and the like. Further any number of WCNs may be used in a WCS including additional WCNs (AWCNS) that are not depicted in the drawing figures. Such AWCNs may use any known or later arising technologies.

Figure 5:
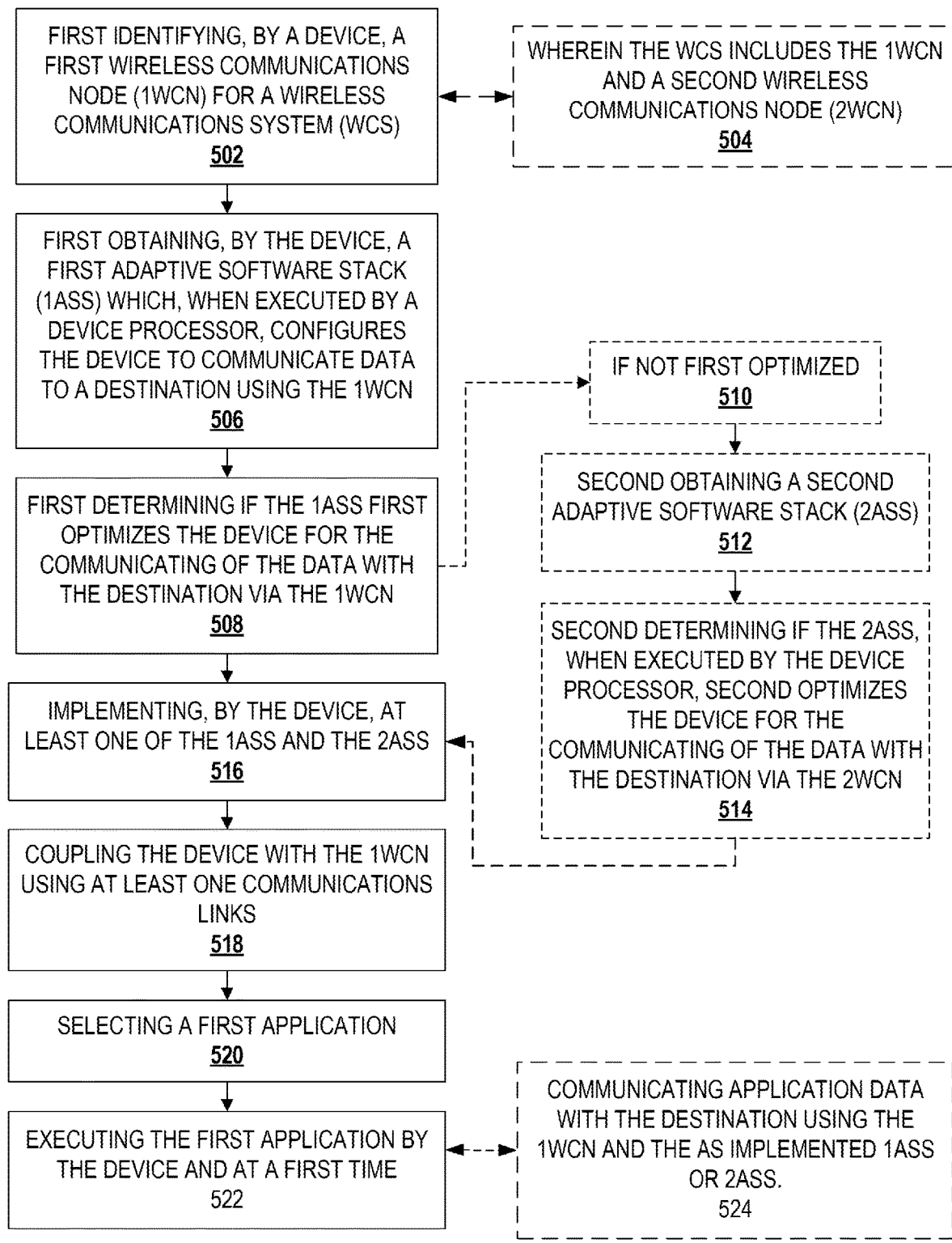
FIG. 5 is a flow chart representing a process for right sizing a software stack on a Device and configuring the Device in accordance therewith for use on a wireless communications system and in accordance with at least one implementation of the present disclosure.

As shown in FIG. 5, a process for right sizing a software stack on a Device and configuring the Device in accordance therewith for use on a wireless communications system and in accordance with at least one implementation of the present disclosure may include, as per Operation 502, first identifying, by a Device 104, a first wireless communications node (1WCN) for a wireless communications system (WCS).

As per Operation 504, the process may include an implementation where the WCS includes the 1WCN and a second wireless communications node (2WCN).

As per Operation 506, the process may include first obtaining, by the Device, a first adaptive software stack (1ASS) which, when executed by a Device processor, configures the Device to communicate data to a Destination using the 1WCN.

As per Operation 508, the process may include first determining if the 1ASS first optimizes the Device for the communicating of the data with the Destination via the 1WCN. If the 1ASS does not so optimize, as per decision Operation 510, the process may include Operations 512 and 514.

As per Operation 512, the process may include second obtaining a second adaptive software stack (2ASS).

As per Operation 514, the process may include second determining if the 2ASS, when executed by the Device processor, second optimizes the Device for the communicating of the data with the Destination via the 2WCN.

As per Operation 516, the process may include implementing, by the Device, at least one of the 1ASS and the 2ASS.

As per Operation 518, the process may include coupling the Device with the 1WCN using at least one communications links.

As per Operation 520, the process may include selecting a first application.

As per Operation 522, the process may include executing the first application by the Device and at a first time.

As per Operation 524, the process may include communicating application data with the Destination using the 1WCN and the, as implemented, 1ASS or 2ASS.

Figure 6:
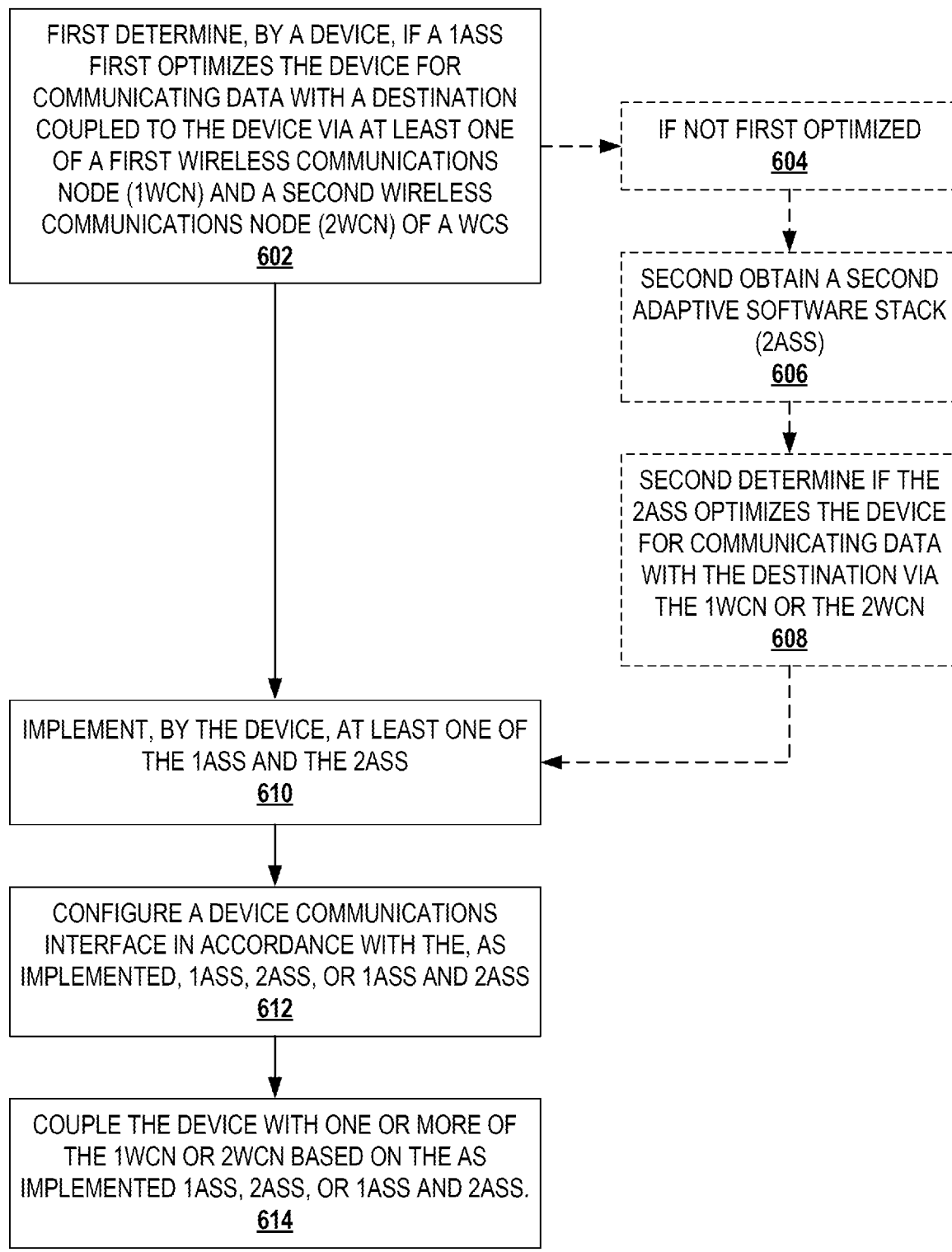
FIG. 6 is a flow chart representing operations performed by a stack engine and a connectivity engine when right sizing a software stack on a Device and configuring the Device in accordance therewith for use on a wireless communications system and in accordance with at least one implementation of the present disclosure.

As shown in FIG. 6, operations performed by a stack engine and a connectivity engine when right sizing a software stack on a Device and configuring the Device in accordance therewith for use on a wireless communications system and in accordance with at least one implementation of the present disclosure, may include, as per Operation 602, first determining if a 1ASS first optimizes the Device for communicating data with a Destination coupled to the Device via at least one of a first wireless communications node (1WCN) and a second wireless communications node (2WCN) of a WCS. If optimization does not occur, determined per Operation 604, the process may include Operations 606 and 608.

As per Operation 606, the process may include second obtaining a second adaptive software stack (2ASS).

As per Operation 608, the process may include second determining if the 2ASS optimizes the Device for communicating data with the Destination via the 1WCN or the 2WCN.

As per Operation 610, the process may include implementing, by the Device, at least one of the 1ASS and the 2ASS.

As per Operation 612, the process may include configuring the Device's communications interface in accordance with the, as implemented, 1ASS, 2ASS, or 1ASS and 2ASS.

As per Operation 614, the process may include coupling the Device with one or more of the 1WCN or 2WCN based on the, as implemented, 1ASS, 2ASS, or 1ASS and 2ASS.

It is to be appreciated that the process flow shown in FIGS. 4-6 and discussed above are for illustrative purposes and is not to be considered limiting an implementation of the present disclosure or an implementation thereof to any specific sequence of operations. Although various implementations have been described above with a certain degree of particularity, or with reference to one or more individual implementations, those skilled in the art could make alterations to the disclosed implementations without departing from the spirit or scope hereof. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down", "first", "second", "next", "last", "before", "after", and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and links may also occur. Further, the terms "and" and "or" are not intended to be used in a limiting or expansive nature and cover any range of combinations of elements and operations of an implementation of the present disclosure. Other implementations are therefore contemplated. It is intended that matter contained in the above description and shown in the accompanying drawings shall be interpreted as illustrative of implementations and not limiting. Changes in detail or structure may be made without departing from the basic elements of the present disclosure as defined in the following claims.

What is claimed is:

1. A process for right-sizing a software stack comprising:
   first identifying, by a Device, a first wireless communications node (1WCN) for a wireless communications system (WCS);
      wherein the WCS includes the 1WCN and a second wireless communications node (2WCN);
   first obtaining, by the Device, a first adaptive software stack (1ASS) which, when executed by a Device processor, configures the Device to communicate data to a Destination using the 1WCN;
   first determining if the 1ASS first optimizes the Device for the communicating of the data with the Destination via the 1WCN;
   if not first optimized:
      second obtaining a second adaptive software stack (2ASS); and
   second determining if the 2ASS, when executed by the Device processor, second optimizes the Device for the communicating of the data with the Destination via the 2WCN; and
   implementing, by the Device, at least one of the 1ASS and the 2ASS;
   coupling the Device with the 1WCN using at least one communications links;
   selecting a first application; and
   executing the first application by the Device and at a first time;
      wherein during the executing of the first application includes communicating application data with the Destination using the 1WCN and the as implemented 1ASS or 2ASS.

2. The process of claim 1, further comprising:
   iteratively repeating the second obtaining and second determining operations until another adaptive software stack (AASS) is obtained;
   wherein the AASS, when executed by the Device processor, third optimizes the Devices to communicate the application data with the Destination via the 1WCN or the 2WCN;
   wherein the first optimization, when available, is utilized before the second optimization and the third optimization;
   wherein when the first optimization is not available, the second optimization is utilized before the third optimization;
   wherein the third optimization is utilized when the first optimization and the second optimization are not available; and
   wherein the first optimization, second optimization, and third optimization provide, from a greater extent to a lesser extent, utilization efficiencies of WCS resources.

3. The process of claim 1, further comprising:
   wherein the 1WCN supports fifth generation (5G) and fourth generation (4G) wireless communications; and
   wherein the 1ASS optimizes the Device for 5G wireless communications; and
   wherein the 2ASS optimizes the Device for 4G wireless communications.

4. The process of claim 1,
   wherein the process further comprises:
   second coupling the Device with the 2WCN;
   third retrieving, by the Device, a third adaptive software stack (3ASS) which, when executed by a Device processor, configures the Device to communicate the application data to the Destination using the 2WCN;
   fourth determining which of a plurality of permutations of an ASS and a WCN optimizes the Device for communicating application data with the Destination via the 1WCN or the 2WCN, wherein the plurality of permutations include:
      a first permutation of the 1ASS with the 1WCN;
      a second permutation of the 2ASS with the 1WCN;
      a third permutation of the 3ASS with the 2WCN;
      a fourth permutation of either the 1ASS or the 2ASS with the 1WCN and the 3ASS with the 2WCN;
   selecting a permutation from at least one of the plurality of permutations which optimizes the Device for communicating the application data with the Destination; and
   second executing the application, at a first time, in view of the selected permutation.

5. The process of claim 1,
wherein the 2ASS optimizes the Device for use with 4G wireless communications via the 1WCN.

6. The process of claim 1,
wherein the WCS further comprises additional wireless communications nodes (AWCNs) including:
 a third wireless communications node (3WCN) configured to support Advanced Television Standards Committee (ATSC) 3.0 wireless communications;
 a fourth wireless communications node (4WCN) configured to support citizens band radio services (CBRS) wireless communications; and
 a local wireless communications node (LWCN) configured to support at least one of Wi-Fi and low-rate wireless personal area network (LR-WPAN) wireless communications; and
wherein the process further comprises:
 selecting one of the AWCNs for use by the Device while executing the first application; and
 selecting at least one ASS which optimizes the Device for the selected AWCN; and
 third executing the application, at least in part, in view of the selected AWCN.

7. The process of claim 6,
wherein the first application is a video streaming application;
wherein the 1ASS supports streaming of a 4K or lesser resolution video signal over the WCS; and
wherein the 2ASS supports streaming of a High Definition (HD) or lesser resolution video signal over the WCS.

8. The process of claim 1, further comprising:
at a second time occurring after the first time:
 detecting a constraint change for at least one the Device, the 1WCN, or the 2WCN;
 third determining, in view of the constraint change, whether the implemented 1ASS or 2ASS continues to optimize the Device for use with the first application and the WCS; and
 when the implemented 1ASS or 2ASS does not continue to optimize the Device:
  fourth determining if the other, non-implemented 1ASS or 2AS optimizes the Device; and
  when the 1ASS and the 2ASS do not optimize the Device:
   third obtaining a third adaptive software stack (3ASS);
    wherein the 3ASS, when executed by the Device processor, configures the Device for use with the first application and the WCS in view of the constraint change; and
    wherein execution of the 3ASS, by the Device processor, results in unoptimized communication of application data with the Destination.

9. The process of claim 8,
wherein the 1ASS is obtained, by the Device, from a Device data store.

10. The process of claim 9,
wherein the Device is coupled, by the WCS, to a server; and
wherein the 2ASS is obtained, by the Device, from a server data store.

11. The process of claim 10,
wherein at least one of the 1ASS and the 2ASS is generated by the server.

12. The process of claim 11,
wherein at least one of the first determining, the second determining, the third determining, and the fourth determining is executed by the server.

13. The process of claim 1,
wherein the Device is coupled, by the WCS, to a server; and
wherein at least one of the 1ASS and the 2ASS is provided by the server to the Device; and
wherein at least one of the first determining and the second determining are performed by the server.

14. A wireless communications system comprising:
a first wireless communications node (1WCN);
a second wireless communications node (2WCN);
a Device coupled to the 1WCN, and the 2WCN; and
a Destination coupled to the Device by one or more of the 1WCN and the 2WCN;
wherein the Device comprises:
 a Device processor;
 a Device communications interface;
 a Device data store;
wherein the Device processor, Device data store and Device communications interface are coupled by a Device bus;
wherein the Device data store non-transitorily stores non-transitory computer instructions including:
 first computer instructions instantiating a Device stack engine;
  wherein, when the Device stack engine is instantiated, the Device performs one or more stack operations comprising:
   first obtaining a first adaptive software stack (1ASS);
   first determining if the 1ASS first optimizes the Device to communicate data with the Destination and via the 1WCN or the 2WCN;
   if not first optimized:
    second obtaining a second adaptive software stack (2ASS); and
    second determining if the 2ASS optimizes the Device for communicating data with the Destination via the 1WCN or the 2WCN; and
    implementing, by the Device, at least one of the 1ASS and the 2ASS; and
 second computer instructions instantiating a Device connection engine;
  wherein, when the Device connection engine is instantiated, the Device performs one or more connectivity operations comprising:
   configuring the Device communications interface in accordance with the, as implemented, 1ASS, 2ASS or 1ASS and 2ASS; and
   coupling the Device with one or more of the 1WCN or 2WCN based on the as implemented 1ASS, 2ASS, or 1ASS and 2ASS; and
  wherein the Device communicates application data with the Destination via the coupling.

15. The wireless communications system of claim 14,
wherein the Device either obtains the 1ASS from the Device data store or generates the 1ASS based upon at least one constraint of the 1WCN.

16. The wireless communications system of claim 14, further comprising:
a server coupled to the Device; and
wherein the Device obtains the 1ASS from the server.

17. The wireless communications system of claim 16, further comprising:
- a network coupling the Destination with at least one of the 1WCN and the 2WCN;
- wherein the server generates the 1ASS based upon one or more constraints of the wireless communications system, the Device, the 1WCN, the 2WCN, the Destination, and the network; and
- wherein the server generates a third adaptive software stack (3ASS) when a change occurs within the wireless communications system.

18. The wireless communications system of claim 14,
wherein the Device communications interface further comprises:
- a universal modem;
- an electronic subscriber identity module (eSIM);
- a software defined radio; and
- a software defined antenna; and
wherein the Device, as per the as implemented 1ASS, 2ASS or 1ASS and 2ASS, changes at least one operating characteristic of the universal modem, the eSIM, the software defined radio, and the software defined antenna.

19. A non-transitory computer readable medium comprising:
- first non-transitory computer instructions, which when executed by a hardware processor of a Device, the Device adaptively utilizes of one or more wireless communications nodes (WCNs) in a wireless communications system (WCS) by performing stack operations comprising:
  - first obtaining, by the Device, a first adaptive software stack (1ASS);
  - first determining, by the Device, if the 1ASS first optimizes the Device to communicate data with a Destination coupled to the Device via at least one of a first wireless communications node (1WCN) and a second wireless communications node (2WCN) of the WCS;
  - if not first optimized:
    - second obtaining a second adaptive software stack (2ASS); and
    - second determining if the 2ASS optimizes the Device to communicate data with the Destination via the 1WCN or the 2WCN; and
  - implementing, by the Device, at least one of the 1ASS and the 2ASS.

20. The non-transitory computer readable medium of claim 19, further comprising:
- second non-transitory computer instructions, which when executed by the hardware processor of the Device, the Device further adaptively utilizes one or more WCNs by performing connectivity operations comprising:
  - configuring a Device communications interface in accordance with the, as implemented, 1ASS, 2ASS, or 1ASS and 2ASS; and
  - coupling the Device with one or more of the 1WCN or 2WCN based on the as implemented 1ASS, 2ASS, or 1ASS and 2ASS.

* * * * *